(12) United States Patent
Sakamoto

(10) Patent No.: US 8,317,655 B2
(45) Date of Patent: Nov. 27, 2012

(54) HYDRAULIC PRESSURE CONTROL APPARATUS FOR TORQUE CONVERTER

(75) Inventor: Osamu Sakamoto, Handa (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 314 days.

(21) Appl. No.: 12/836,291

(22) Filed: Jul. 14, 2010

(65) Prior Publication Data

US 2011/0011075 A1 Jan. 20, 2011

(30) Foreign Application Priority Data

Jul. 16, 2009 (JP) ................................. 2009-167805

(51) Int. Cl.
- *F16H 61/48* (2006.01)
- *F16H 61/64* (2006.01)
- *F16D 33/00* (2006.01)
- *F16D 35/00* (2006.01)
- *F16D 37/00* (2006.01)

(52) U.S. Cl. .............. 477/53; 477/61; 477/67; 192/3.29

(58) Field of Classification Search .............. 477/53–67; 192/3.28, 3.29, 3.33

See application file for complete search history.

(56) References Cited

U.S. PATENT DOCUMENTS

| 2010/0282558 A1* | 11/2010 | Ishiwada et al. | 192/3.29 |
| 2011/0011690 A1* | 1/2011 | Sakamoto | 192/3.29 |
| 2011/0247443 A1* | 10/2011 | Shimizu et al. | 74/473.11 |

FOREIGN PATENT DOCUMENTS

| JP | 6-147311 A | 5/1994 |
| JP | 2000-54877 A | 2/2000 |

* cited by examiner

*Primary Examiner* — Tisha Lewis

(74) *Attorney, Agent, or Firm* — Buchanan Ingersoll & Rooney PC

(57) ABSTRACT

A hydraulic pressure control apparatus for a torque converter includes a relay valve switching levels of a hydraulic pressure in the hydraulic power transmission chamber and establishing selective connections between a cooler and the hydraulic power transmission chamber or between the cooler and a hydraulic pressure supply source of which a flow amount of the operational fluid is regulated by a first orifice, an electronic control unit controlling operations of the relay valve, a hydraulic pressure declination determining portion judging whether the hydraulic pressure of the hydraulic pressure supply source is lower than a threshold value based on a predetermined vehicle state, and a switching command outputting portion outputting a command to connect the cooler and the hydraulic pressure supply source by the relay valve when the hydraulic pressure declination determining portion determines that the hydraulic pressure of the hydraulic pressure supply source is lower than the threshold value.

8 Claims, 1 Drawing Sheet

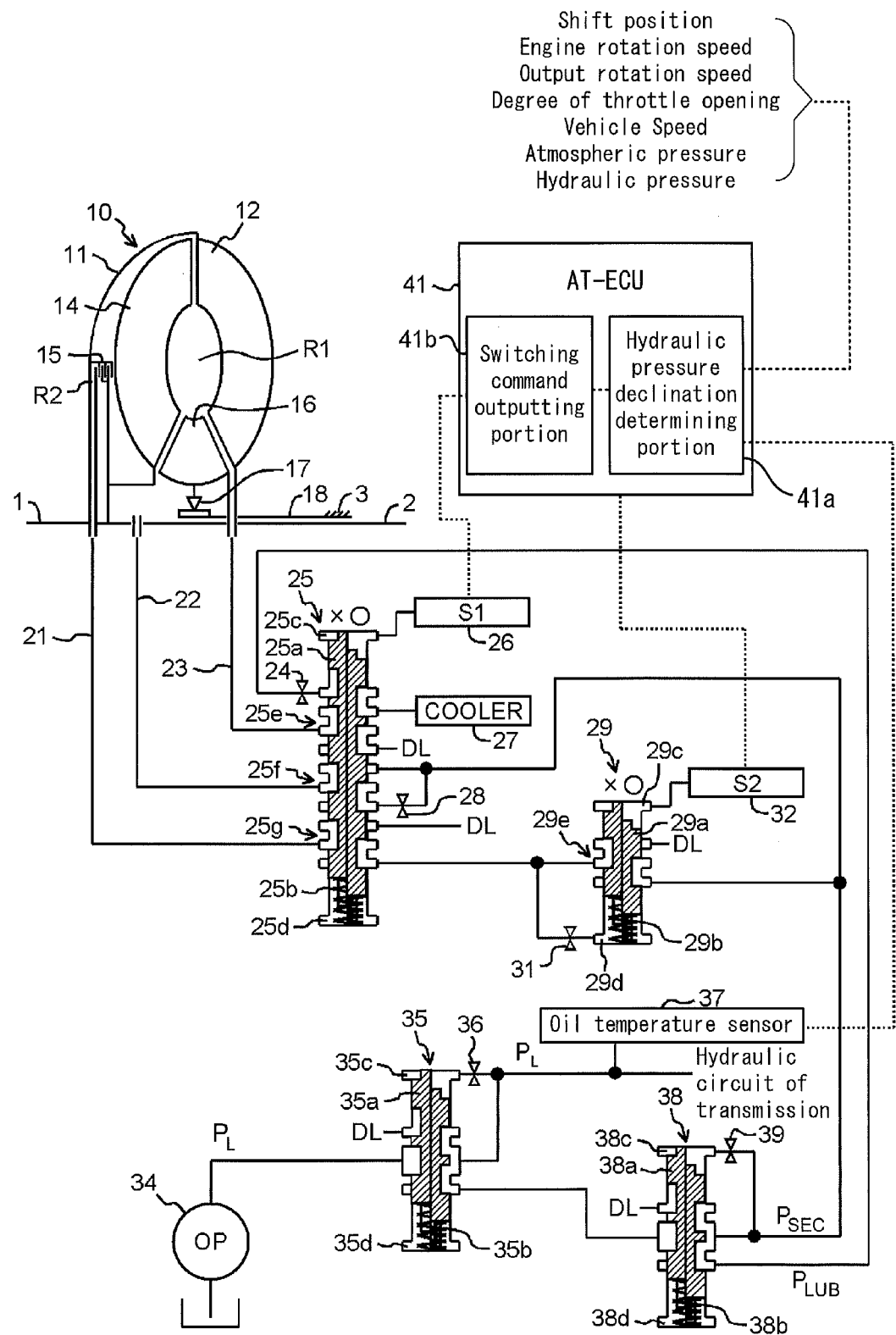

HYDRAULIC PRESSURE CONTROL APPARATUS FOR TORQUE CONVERTER

CROSS REFERENCE TO RELATED APPLICATIONS

This application is based on and claims priority under 35 U.S.C. §119 to Japanese Patent Application 2009-167805, filed on Jul. 16, 2009, the entire content of which is incorporated herein by reference.

TECHNICAL FIELD

This disclosure relates to a hydraulic pressure control apparatus for a torque converter for controlling a hydraulic pressure applied to an engaging element of the torque converter.

BACKGROUND DISCUSSION

Automatic transmissions include a hydraulic power transmission having, on a torque delivery path between a power source and a transmission, a fluid coupling or a torque converter which is configured to transmit a torque of the power source continuously from a stall state to a directly connected state of an output shaft of the power source and an input shaft of the transmission. A known torque converter includes a lock-up clutch which directly connects a pump impeller and a turbine runner to eliminate a rotational speed difference therebetween when a rotational speed difference between the pump impeller and the turbine runner is small in order to enhance fuel economy during an operation of a vehicle. The lock-up clutch is controlled to be engaged or disengaged by a hydraulic pressure control of the hydraulic pressure control apparatus.

Known hydraulic pressure control apparatuses disclose technologies which stabilizes a hydraulic pressure outputted from an oil pump in an idling state of a vehicle. For example, JPH-06-147311A (hereinafter referred to as Patent document 1) discloses a known hydraulic pressure control apparatus which includes an oil pump driven by an engine, a pressure regulator valve which regulates oil outputted from the oil pump to be a level of target line pressure in accordance with a vehicle state, a lock-up control valve which introduces the line pressure to a lock-up chamber of a torque converter with a lock-up mechanism to establish an engaged state of the lockup mechanism and releasing an excessive oil to a circulation system via an oil cooler, and a circulation system fluid amount restricting means which reduces a dimension of an oil path at a position downstream from the lock-up control valve and upstream from the oil cooler when an amount of the oil outputted from the oil pump is reduced and an actual line pressure is reduced to be lower than the target line pressure. JP2000-54877A (hereinafter referred to as Patent reference 2) discloses an apparatus for an automatic transmission which is configured to transmit a rotational torque from an engine by an engagement of a frictional element for vehicle start by means of a hydraulic pressure operation during a gear selecting operation from a non-traveling range to a traveling range, which is configured to increase engine rotation speed in an idling state when an engine rotation speed does not decline in response to the engagement of the frictional element for vehicle start in a predetermined time from the gear selecting operation.

According to the construction of the hydraulic pressure control apparatus disclosed in Patent reference 1, in order to reduce the oil to be outputted from the lock-up control valve by the excessive amount, the circulation system fluid amount restricting means is additionally required, which increases a manufacturing cost. Further, according to the apparatus disclosed in Patent reference 2, in order to compensate for a lack of outputted amount of the oil from the oil pump, a control for increasing an engine rotation speed is performed during the gear selecting operation. With this construction, because the lack of the outputted amount of the oil from the oil pump is not overcome only by the automatic transmission, not only a control for the automatic transmission but also a control for the engine is complicated and a manufacturing cost increases.

A need thus exists for a hydraulic pressure control apparatus for a torque converter which is not susceptible to the drawback mentioned above.

SUMMARY

In light of the foregoing, the disclosure provides a hydraulic pressure control apparatus for a torque converter in which a turbine runner is rotated by operational fluid outputted from a pump impeller rotating in a hydraulic power transmission chamber, which includes a relay valve, a solenoid valve, an electronic control unit, a hydraulic pressure declination determining portion, and a switching command outputting portion. The relay valve is configured to switch levels of a hydraulic pressure in the hydraulic power transmission chamber to be a higher pressure or a lower pressure and to establish selective connections between a cooler and the hydraulic power transmission chamber or between the cooler and a hydraulic pressure supply source of which a flow amount of the operational fluid is regulated by a first orifice. The relay valve connects the cooler and the hydraulic power transmission chamber when the hydraulic pressure in the hydraulic power transmission chamber is higher than a predetermined level and connects the cooler and the hydraulic pressure supply source when the hydraulic pressure in the hydraulic power transmission chamber is lower than the predetermined level. The solenoid valve operates the relay valve in accordance with an energization state. The electronic control unit controls the solenoid valve. The hydraulic pressure declination determining portion provided in the electronic control unit judges whether the hydraulic pressure of the hydraulic pressure supply source is lower than a threshold value based on a predetermined vehicle state. The switching command outputting portion provided in the electronic control unit outputs a command to connect the cooler and the hydraulic pressure supply source by the relay valve when the hydraulic pressure declination determining portion determines that the hydraulic pressure of the hydraulic pressure supply source is lower than the threshold value.

According to another aspect, a hydraulic pressure control apparatus for a torque converter in which a turbine runner is rotated by operational fluid outputted from a pump impeller rotating in a hydraulic power transmission chamber includes a relay valve, an electronic control unit, a hydraulic pressure declination determining portion, and a switching command outputting portion. The relay valve is configured to switch levels of a hydraulic pressure in the hydraulic power transmission chamber to be a higher pressure or a lower pressure and to establish selective connections between a cooler and the hydraulic power transmission chamber or between the cooler and a hydraulic pressure supply source of which a flow amount of the operational fluid is regulated by a first orifice. The relay valve connects the cooler and the hydraulic power transmission chamber when the hydraulic pressure in the hydraulic power transmission chamber is higher than a predetermined level and connects the cooler and the hydraulic pressure supply source when the hydraulic pressure in the hydraulic power transmission chamber is lower than the predetermined level. The electronic control unit controls operations of the relay valve. The hydraulic pressure declination determining portion provided in the electronic control unit judges whether the hydraulic pressure of the hydraulic pressure supply source is lower than a threshold value based on a predetermined vehicle state. The switching command outputting portion provided in the electronic control unit outputs a command to connect the cooler and the hydraulic pressure supply source by the relay valve when the hydraulic pressure declination determining portion determines that the hydraulic pressure of the hydraulic pressure supply source is lower than the threshold value.

BRIEF DESCRIPTION OF THE DRAWINGS

The foregoing and additional features and characteristics of this disclosure will become more apparent from the following detailed description considered with the reference to the accompanying drawing, wherein:

FIG. 1 is a schematic view of a hydraulic pressure control apparatus for a torque converter according to an embodiment disclosed here.

DETAILED DESCRIPTION

One embodiment of a hydraulic pressure control apparatus for a torque converter will be explained with reference to FIG. 1.

The hydraulic pressure control apparatus for the torque converter according to the embodiment corresponds to a hydraulic pressure control apparatus for a torque converter 10 in which a turbine runner 14 is rotated by operational fluid outputted from a pump impeller 12 rotating in a hydraulic power transmission chamber R1, which includes a relay valve 25, a solenoid valve 26, an electronic control unit 41, a hydraulic pressure declination determining portion 41a, and a switching command outputting portion 41b. The relay valve 25 is configured to switch levels of a hydraulic pressure in the hydraulic power transmission chamber R1 to be a higher pressure or a lower pressure and to establish selective connections between a cooler 27 and the hydraulic power transmission chamber R1 or between the cooler 27 and a hydraulic pressure supply source (e.g., represented by a second pressure regulating valve 38; $P_{SEC}$) of which a flow amount of the operational fluid is regulated by a first orifice 24. The relay valve 25 connects the cooler 27 and the hydraulic power transmission chamber R1 when the hydraulic pressure in the hydraulic power transmission chamber R1 is higher than a predetermined level and connects the cooler 27 and the hydraulic pressure supply source (e.g., represented by the second pressure regulating valve 38; $P_{SEC}$) when the hydraulic pressure in the hydraulic power transmission chamber R1 is lower than the predetermined level. The solenoid valve 26 operates the relay valve 25 in accordance with an energization state. The electronic control unit 41 controls the solenoid valve 26. The hydraulic pressure declination determining portion 41a provided in the electronic control unit 41 judges whether the hydraulic pressure of the hydraulic pressure supply source (e.g., represented by the second pressure regulating valve 38; $P_{SEC}$) is lower than a threshold value based on a predetermined vehicle state. The switching command outputting portion 41b provided in the electronic control unit 41 outputs a command to connect the cooler 27 and the hydraulic pressure supply source (e.g., represented by the second pressure regulating valve 38; $P_{SEC}$) by the relay valve 25 when the hydraulic pressure declination determining portion 41a determines that the hydraulic pressure of the hydraulic pressure supply source (e.g., represented by the second pressure regulating valve 38; $P_{SEC}$) is lower than the threshold value. The hydraulic pressure declination determining portion 41a judges whether the hydraulic pressure of the hydraulic pressure supply source (e.g., represented by the second pressure regulating valve 38; $P_{SEC}$) is lower than the threshold value based on the predetermined vehicle state, for example, including at least one of a shift position, an operational fluid temperature, an engine rotation speed, an output rotation speed of the torque converter, a vehicle speed, atmospheric pressure, a degree of throttle opening, and hydraulic pressure.

As shown in FIG. 1, the hydraulic pressure control apparatus for the torque converter according to the embodiment corresponds to the hydraulic pressure control apparatus for the torque converter 10 including a lock-up clutch 15 which eliminates the rotational speed difference between a power source (e.g., engine) and the turbine runner 14 by directly connecting the pump impeller 12 and the turbine runner 14 when the rotational speed difference between the pump impeller 12 and the turbine runner 14 is small. The hydraulic pressure control apparatus controls a hydraulic pressure supplied to the lock-up clutch 15 so as to engage the lock-up clutch 15 by supplying the hydraulic pressure thereto and to disengage the lock-up clutch 15 by not supplying the hydraulic pressure thereto. The hydraulic pressure control apparatus includes a lock-up clutch fluid path 21, a torque converter inlet side fluid path 22, a torque converter outlet side fluid path 23, the orifice 24, the lock-up relay valve 25, the solenoid valve 26, the cooler 27, an orifice 28, a lock-up clutch control valve 29, an orifice 31, a solenoid valve 32, an oil pump 34, a first pressure regulating valve 35, an orifice 36, an oil temperature sensor 37, the second pressure regulating valve 38, an orifice 39, and the electronic control unit 41.

The torque converter 10 is a hydraulic power transmission which increases a torque by a difference of rotation speed between the pump impeller 12 provided at an input side and the turbine runner 14 provided at an output side. The torque converter 10 is disposed on a torque delivery path (power transmission path) between an output shaft 1 for an engine and an input shaft 2 for a transmission. The torque converter 10 includes a converter shell 11, the pump impeller 12, the turbine runner 14, the lock-up clutch 15, a stator 16, a one-way clutch 17, a stator shaft 18, the hydraulic power transmission chamber R1, and a lock-up clutch hydraulic pressure chamber R2.

The converter shell 11 serves as a casing for the torque converter 10. The converter shell 11 always integrally rotates with the output shaft 1 for the engine and the pump impeller 12. Components of the torque converter 10 and operational fluids are disposed within the converter shell 11. The converter shell 11 is configured to be relatively rotatable to the turbine runner 14 and to be integrally rotatable with the turbine runner 14 when the lock-up clutch 15 is engaged.

The pump impeller 12 rotates to output the operational fluid to the turbine runner 14. The pump impeller 12 integrally rotates with the converter shell 11.

The turbine runner 14 rotates receiving the operational fluid outputted from the pump impeller 12. The turbine runner 14 always integrally rotates with the input shaft 2 for the transmission. The turbine runner 14 is configured to be relatively rotatable to the converter shell 11 and to be integrally rotatable with the converter shell 11 when the lock-up clutch 15 is engaged.

The lock-up clutch 15 is a multi-plate clutch mechanism which eliminates the rotational speed difference between the power source (e.g., engine) and the turbine runner 14 by directly connecting the pump impeller 12 and the turbine runner 14 when the rotational speed difference between the pump impeller 12 and the turbine runner 14 is small. When the lock-up clutch 15 is engaged, a torque of the converter shell 11 is transmitted to the turbine runner 14. The lock-up clutch 15 includes input side clutch plates which are connected to the converter shell 11 not to be relatively rotatable but to be movable in an axial direction, output side clutch plates which are connected to the turbine runner 14 not to be relatively rotatable but to be movable in an axial direction, and a piston which is pushed out by supplying the hydraulic pressure into the lock-up clutch hydraulic pressure chamber R2. The input side clutch plates and the output side clutch plates are positioned alternately in the lock-up clutch 15, and the piston pushes the input side clutch plate and the output side clutch plate to frictionally engage the input side clutch plates and the output side clutch plates.

The stator 16 is disposed between the turbine runner 14 and the pump impeller 12 closer to an inner periphery and corresponds to an impeller which generates torque multiplication by adjusting and returning the operational fluid discharged from the turbine runner 14 to the pump impeller 12. The stator 16 is fixed to a transmission case 3 via the one-way clutch 17 and the stator shaft 18 and is configured to rotate only in one direction.

The one-way clutch 17 allows the stator 16 to rotate only in one direction. The stator 16 is fixed to a rotational end of the one-way clutch 17. A fixed end of the one-way clutch 17 is fixed to the transmission case 3 via the stator shaft 18.

The stator shaft 18 is a shaft member for fixing the fixed end of the one-way clutch 17 to the transmission case 3.

The hydraulic power transmission chamber R1 accommodates the pump impeller 12, the turbine runner 14, and the stator 16, and is filled with the operational fluid. The hydraulic pressure is supplied to the hydraulic power transmission chamber R1 via the torque converter inlet side fluid passage 22 and the hydraulic pressure is discharged from the hydraulic power transmission chamber R1 via the torque converter outlet side fluid passage 23.

The lock-up clutch hydraulic pressure chamber R2 is arranged for operating the lock-up clutch 15. The lock-up clutch hydraulic pressure chamber R2 is connected to the lock-up clutch fluid passage 21. In a case where a hydraulic pressure higher than a hydraulic pressure in the hydraulic power transmission chamber R1 is supplied to the lock-up clutch hydraulic pressure chamber R2, the lock-up clutch 15 is engaged, and the lock-up clutch 15 is disengaged in a case where a hydraulic pressure in the lock-up clutch hydraulic pressure chamber R2 is lower than a hydraulic pressure in the hydraulic power transmission chamber R1.

The lock-up clutch fluid passage 21 connects the lock-up clutch hydraulic pressure chamber R2 and a switching portion 25g of the lock-up relay valve 25. The torque converter inlet side fluid passage 22 connects a switching portion 25f of the lock-up relay valve 25 and the hydraulic power transmission chamber R1 of the torque converter 10 to supply the hydraulic pressure to the hydraulic power transmission chamber R1 via the switching portion 25f. The torque converter outlet side fluid passage 23 connects a switching portion 25e of the lockup relay valve 25 and the hydraulic power transmission chamber R1 of the torque converter 10 to discharge the hydraulic pressure from the hydraulic power transmission chamber R1 to the switching portion 25e.

The orifice 24 regulates (controls) an amount of a lubricating pressure $P_{LUB}$ (i.e., a pressure necessary for lubricating gears of transmission) outputted from the second pressure regulating valve 38. The operational fluid which flows through the orifice 24 is directed to the switching portion 25e of the lock-up relay valve 25.

The lock-up relay valve 25 is a switching valve which switches fluid paths. The lock-up relay valve 25 includes a spool 25a, a spring 25b, a hydraulic pressure chamber 25c, a spring chamber 25d, and the switching portions 25e, 25f, 25g, which are provided within a valve body. The spool 25a is slidably disposed within the valve body. The spring 25b is disposed within the spring chamber 25d to bias the spool 25a towards the hydraulic pressure chamber 25c. The hydraulic pressure chamber 25c is configured to receive a signal pressure of the solenoid valve 26 (i.e., a pressure outputted via the solenoid valve 26 which is operated based on a signal from the electronic control unit 41) to push the spool 25a towards the spring chamber 25d to compress the spring 25b. The spring chamber 25d houses the spring 25b. The spool 25a slides towards the spring chamber 25d side (i.e., represented by a circle in FIG. 1) when a level of force by the hydraulic pressure in the hydraulic pressure chamber 25c (i.e., signal pressure of the solenoid valve 26) is higher than a sum of biasing force of the spring 25b and the hydraulic pressure in the spring chamber 25d (i.e., output pressure from the lock-up clutch control valve 29). The spool 25a slides towards the hydraulic pressure chamber 25c side (i.e., represented by an X mark in FIG. 1) when a level of force by the hydraulic pressure in the hydraulic pressure chamber 25c (i.e., signal pressure of the solenoid valve 26) is lower than the sum of biasing force of the spring 25b and the hydraulic pressure in the spring chamber 25d (i.e., output pressure from the lock-up clutch control valve 29). The lock-up relay valve 25 includes the switching portion 25e which switches communications of the components. That is, in a state signal pressure of the solenoid valve 26 is lower than the sum of biasing force of the spring 25b and the hydraulic pressure in the spring chamber 25d as indicated by the X mark in FIG. 1 (i.e., hereinafter referred to as the X-mark state in FIG. 1), the switching portion 25e establishes the communication between the torque converter outlet side fluid passage 23 and the cooler 27, blocks the cooler 27 from a port to which the lubricating pressure $P_{LUB}$ outputted from the second pressure regulating valve 38 is inputted via the orifice 24, and blocks the torque converter outlet side fluid passage 23 from a drain port DL. Further, in a state where the signal pressure of the solenoid valve 26 is higher than a sum of biasing force of the spring 25b and the hydraulic pressure in the spring chamber 25d as indicated by the circle mark in FIG. 1 (i.e., hereinafter referred to as the circle-mark state in FIG. 1), the switching portion 25e establishes the communication between the torque converter outlet side fluid passage 23 and the drain portion DL, establishes the communication between the port to which the lubricating pressure $P_{LUB}$ outputted from the second pressure regulating valve 38 is inputted via the orifice 24 and the cooler 27, and blocks the cooler 27 from the torque converter outlet side fluid passage 23. The lock-up relay valve 25 further includes the switching portion 25f which switches the communications of the components. That is, in the X-mark state in FIG. 1, the switching portion 25f establishes the communication between the torque converter inlet side fluid passage 22 and an inlet port of secondary pressure $P_{SEC}$ outputted from the second pressure regulating valve 38. Further, in the circle-mark state in FIG. 1, the switching portion 25f establishes the communication between the converter inlet side fluid passage 22 and a port to which the secondary pressure $P_{SEC}$ outputted from the second pressure regulating valve 38 is inputted via the orifice 28. The switching portions 25e, 25f switch the communications of the components so that the secondary pressure $P_{SEC}$ flows into the cooler 27 via the hydraulic power transmission chamber R1 to increase the pressure in the torque converter 10 (i.e., the hydraulic pressure in the hydraulic power transmission chamber R1) in the X-mark state in FIG. 1. The switching portions 25e, 25f switch the communications of the components so that the orifice 28 regulates a flowing amount of the secondary pressure $P_{SEC}$ and the secondary pressure $P_{SEC}$ is drained via the hydraulic power transmission chamber R1 to decrease the pressure in the torque converter 10 in the circle-mark state in FIG. 1. Further, the switching portion 25e increases the amount of the secondary pressure $P_{SEC}$ supplied to the cooler 27 via the hydraulic power transmission chamber R1 in the X-mark state in FIG. 1, and reduces the amount of the secondary pressure $P_{SEC}$ supplied to the cooler 27 by regulating the amount of the secondary pressure $P_{SEC}$ by the orifice 24 in the circle-mark state in FIG. 1. The lock-up relay valve 25 further includes the switching portion 25g which switches the communications of the components. The switching portion 25g establishes the communication between the lock-up clutch fluid passage 21 and the drain port DL in the X-mark state in FIG. 1. The switching portion 25g establishes the lock-up clutch fluid passage 21 and the lock-up clutch control valve 29 in the circle-mark state in FIG. 1. When the switching portion 25g establishes the communication between the lock-up clutch fluid passage 21 and the lock-up clutch control valve 29, the hydraulic pressure at the switching portions 25e, 25f is assumed to be lower than the pressure in the lock-up clutch fluid passage 21. When the switching portion 25g does not communicate the lock-up clutch fluid passage 21 and the lock-up clutch control valve 29, the hydraulic pressure at the switching portions 25e, 25f is assumed to be higher than the pressure in the lock-up clutch fluid passage 21.

The solenoid valve 26 is an on-off solenoid valve which controls whether or not to supply the hydraulic pressure to the hydraulic pressure chamber 25c of the lock-up relay valve 25 in response to switching of energizing/non-energizing. The solenoid valve 26 is a normal low (NL) type solenoid valve which is configured to output the hydraulic pressure when energized and not to output the hydraulic pressure when not energized. The solenoid valve 26 is controlled by the electronic control unit 41. Instead of the on-off type solenoid valve, a linear type solenoid valve which regulates a level of the hydraulic pressure in response to amounts of electric currents may be applied as the solenoid valve 26.

The cooler 27 is configured to cool the operational fluid in a hydraulic circuit. The operational fluid which is outputted through the switching portion 25e of the lock-up relay valve 25 is supplied to the cooler 27. The cooler 27 radiates the heat of the operational fluid so that the operational fluid is cooled, and outputs the cooled operational fluid to an oil pan.

The orifice 28 regulates (controls) the flowing amount of the secondary pressure $P_{SEC}$ outputted from the second pressure regulating valve 38. The operational fluid which flows through the orifice 28 is directed to the switching portion 25f of the lock-up relay valve 25.

The lock-up clutch control valve 29 is configured to regulate and output the hydraulic pressure (e.g., line pressure PO of a supply source of the hydraulic pressure in accordance with the signal pressure of the solenoid valve 32. The lock-up clutch control valve 29 includes a spool 29a, a spring 29b, a hydraulic pressure chamber 29c, a spring chamber 29d, and a switching portion 29e, which are provided within a valve body. The spool 29a is slidably disposed within the valve body. The spring 29b is disposed within the spring chamber 29d to bias the spool 29a towards the hydraulic pressure chamber 29c. The hydraulic pressure chamber 29c is configured to push the spool 29a towards the spring chamber 29d by means of a signal pressure of the solenoid valve 32 (i.e., a pressure outputted via the solenoid valve 32 which is operated based on a signal from the electronic control unit 41). The spring chamber 29d houses the spring 29b. A lock-up pressure outputted from the switching portion 29e is introduced (feedback) to the spring chamber 29d via the orifice 31. The spool 29a slides towards the spring chamber 29d side (i.e., represented by the circle in FIG. 1) when a level of force by the hydraulic pressure in the hydraulic pressure chamber 29c (i.e., signal pressure of the solenoid valve 32) is higher than a sum of biasing force of the spring 29b and the hydraulic pressure in the spring chamber 29d (i.e., output pressure from the switching portion 29e of the lock-up clutch control valve 29). The spool 29a slides towards the hydraulic pressure chamber 29c side (i.e., represented by the X mark in FIG. 1) when a level of force by the hydraulic pressure in the hydraulic pressure chamber 29c (i.e., signal pressure of the solenoid valve 32) is lower than the sum of biasing force of the spring 29b and the hydraulic pressure in the spring chamber 29d (i.e., output pressure from the switching portion 29e of the lock-up clutch control valve 29). The lock-up relay valve 29 includes the switching portion 29e which switches communications of the components. That is, in a state where the signal pressure of the solenoid valve 32 is lower than the sum of biasing force of the spring 29b and the hydraulic pressure in the spring chamber 29d as indicated by the X mark in FIG. 1 (i.e., hereinafter referred to as the X-mark state in FIG. 1), the switching portion 29e establishes the communication among the switching portion 25g of the lock-up relay valve 25, the spring chamber 29d of the lock-up clutch control valve 29, and the drain port DL. Further, in a state where the signal pressure of the solenoid valve 32 is higher than the sum of biasing force of the spring 29b and the hydraulic pressure in the spring chamber 29d as indicated by the circle mark in FIG. 1 (i.e., hereinafter referred to as the circle-mark state in FIG. 1), the switching portion 29e establishes the communication among the switching portion 25g of the lock-up relay valve 25, the spring chamber 29d of the lock-up clutch control valve 29, and the secondary pressure $P_{SEC}$ outputted from the second pressure regulating valve 38.

The orifice 31 regulates (controls) the amount of the hydraulic pressure outputted via the switching portion 29e of the lock-up clutch control valve 29. The hydraulic pressure which flows through the orifice 31 is directed to the spring chamber 29d of the lock-up clutch control valve 29.

The solenoid valve 32 is a linear type solenoid valve which is configured to control the hydraulic pressure to be supplied to the hydraulic chamber 29c of the lock-up clutch control valve 29 in accordance with a level of electric current. The solenoid valve 32 is a normal low type (NL) solenoid valve which outputs a modulator pressure $P_{MOD}$ or a reduced modulator pressure $P_{MOD}$ (i.e., a pressure lower than the modulator pressure $P_{MOD}$) when energized and which does not output the modulator pressure $P_{MOD}$ when not energized. The solenoid valve 32 is controlled by the electronic control unit 41.

The oil pump 34 sucks oil reserved in the oil pan to pump the oil into the first pressure regulating valve 35. The oil pump 34 is driven by the engine or a motor.

The first pressure regulating valve 35 regulates the hydraulic pressure of the oil outputted from the oil pump 34 to output the line pressure $P_L$ and an original pressure for the secondary pressure $P_{SEC}$. The first pressure regulating valve 35 includes a spool 35a, a spring 35b, a hydraulic pressure chamber 35c, and a spring chamber 35d, which are provided within a valve body. The spool 35a is slidably disposed within the valve body. The spring 35b is disposed within the spring chamber 35d to bias the spool 35a towards the hydraulic pressure chamber 35c. The line pressure $P_L$ is introduced (feedback) to the hydraulic pressure chamber 35c via the orifice 36. The spring chamber 35d houses the spring 35b. The first pressure regulating valve 35 slides the spool 35a towards the spring chamber 35d side as the force by the hydraulic pressure in the hydraulic pressure chamber 35c exceeds the biasing force of the spring 35b to increase the draining amount of the operational fluid, thereby regulating the hydraulic pressure so as to reduce the a fluctuation of the line pressure $P_L$ and the original pressure for the secondary pressure $P_{SEC}$. The line pressure $P_L$ outputted from the first pressure regulating valve 35 flows to a hydraulic circuit for the transmission and the hydraulic pressure chamber 35c. The original pressure for the secondary pressure $P_{SEC}$ outputted from the first pressure regulating valve 35 flows to the second pressure regulating valve 38.

The orifice 36 regulates (controls) the flowing amount of the line pressure $P_L$ outputted from the first pressure regulating valve 35. The line pressure $P_L$ flowing through the orifice 36 flows to the hydraulic pressure chamber 35c of the first pressure regulating valve 35.

The oil temperature sensor 37 detects the oil temperature of the line pressure $P_L$ outputted from the first pressure regulating valve 35. The oil temperature sensor 37 is communicably connected to the electronic control unit 41.

The second pressure regulating valve 38 regulates the original pressure for the secondary pressure $P_{SEC}$ outputted from the first pressure regulating valve 35 to output the secondary pressure $P_{SEC}$ and the lubrication pressure $P_{LUB}$. The second pressure regulating valve 38 includes a spool 38a, a spring 38b, a hydraulic pressure chamber 38c, and a spring chamber 38d, which are provided within a valve body. The spool 38a is slidably disposed within the valve body. The spring 38b is disposed within the spring chamber 38d to bias the spool 38a towards the hydraulic pressure chamber 38c. The secondary pressure $P_{SEC}$ is introduced (feedback) to the hydraulic pressure chamber 38c via the orifice 39. The spring chamber 38d houses the spring 38b. The second pressure regulating valve 38 slides the spool 38a towards the spring chamber 38d side as the force by the hydraulic pressure in the hydraulic pressure chamber 38c exceeds the biasing force of the spring 38b to increase the draining amount of the operational fluid, thereby regulating the hydraulic pressure so as to reduce the a fluctuation of the secondary pressure $P_{SEC}$ and the lubrication pressure $P_{LUB}$. The secondary pressure $P_{SEC}$ outputted from the second pressure regulating valve 38 flows to the switching portion 29e of the lock-up clutch control valve 29, the switching portion 25f of the lock-up relay valve 25, and the hydraulic pressure chamber 38c. The lubrication pressure $P_{LUB}$ outputted from the second pressure regulating valve 38 flows to the switching portion 25e of the lock-up relay valve 25.

The orifice 39 regulates (controls) the flow amount of the secondary pressure $P_{SEC}$ outputted from the second pressure regulating valve 38. The secondary pressure $P_{SEC}$ flowing through the orifice 39 flows to the hydraulic pressure chamber 38c of the second pressure regulating valve 38.

The electronic control unit 41 is a computer which controls operations of the solenoid valve 26 and the solenoid valve 32. The electronic control unit 41 performs data processing (information processing) based on a predetermined program (i.e., a program including a data base, or a map, or the like). The electronic control unit 41 performs the data processing (information processing) in response to signals outputted from various sensors, or the like. The electronic control unit 41 monitors (senses) an engine rotation speed and a rotation speed of the input shaft of the transmission, and controls the lock-up clutch 15 to be engaged when the difference between the engine rotation speed and the rotational speed of the input shaft is assumed to be equal to or less than a predetermined value. By executing the program, the electronic control unit 41 achieves the hydraulic pressure declination determining portion 41a and the switching command outputting portion 41b. The hydraulic pressure declination determining portion 41a determines whether the line pressure $P_L$ (or the secondary pressure $P_{SEC}$) is lower than a predetermined threshold value on the basis of one of signals from the various sensors or a combination of signals from the various sensors (e.g., signals associated with, for example, shift position, engine rotation speed, output rotation speed of the torque converter, degree of throttle opening, vehicle speed, atmospheric pressure, hydraulic pressure, oil temperature, or the like). The switching command outputting portion 41b is configured to output a command (a command to output the signal pressure to the hydraulic pressure chamber 25c) to the solenoid valve 26 to operate the lock-up relay valve 25 to be switched to the state indicated by the circle in FIG. 1 so as to reduce the amount of the operational fluid flowing to the cooler 27 in a case where the line pressure $P_L$ is lower than the predetermined threshold value based on results determined by the switching command outputting portion 41b. Detailed operations of the electronic control unit 41 will be explained hereinafter.

Operations of the hydraulic pressure control apparatus for the torque converter according to the first embodiment will be explained hereinafter.

First, normal operations of the hydraulic pressure control apparatus for the torque converter will be explained as follows. In the normal operations, the electronic control unit 41 controls the lock-up relay valve 25 to operate the spring 25b to be and to be in an expanded state (i.e., the state indicated by the X mark in FIG. 1) by controlling not to output the signal pressure from the solenoid valve 26. In this state, the secondary pressure $P_{SEC}$ outputted from the second pressure regulating valve 38 is introduced to the torque converter inlet side fluid passage 22, then to the hydraulic power transmission chamber R1. Thereafter, the fluid flowing back through the torque converter outlet side fluid passage 23 (i.e., the fluid whose pressure is enhanced in the hydraulic power transmission chamber R1) is introduced to the cooler 27 in order to decrease the temperature thereof. In those circumstances, the amount of operational fluid flowing into the cooler 27 is determined to be greater so as to decrease the temperature of the operational fluid.

Second, operations of the hydraulic pressure control apparatus for the torque converter when the hydraulic pressure is declined will be explained as follows. In a case where the hydraulic pressure is declined, the electronic control unit 41 judges whether the line pressure $P_L$ (or secondary pressure $P_{SEC}$) is lower than a predetermined value (predetermined threshold value) at the hydraulic pressure declination determining portion 41a on the basis of one of or a combination of signals from various sensors (e.g., signals associated with, for example, shift position, engine rotation speed, output rotation speed of the torque converter, degree of throttle opening, vehicle speed, atmospheric pressure, hydraulic pressure, oil temperature, or the like) (Step A1).

Whether the line pressure $P_L$ (or secondary pressure $P_{SEC}$) is lower than a predetermined value (predetermined threshold value) may be judged, for example, by judging whether the engine rotation speed is lower than a predetermined value (predetermined threshold value). Whether the line pressure $P_L$ (or secondary pressure $P_{SEC}$) is lower than the predetermined value may also be judged, for example, when the shift position is shifted from a non-traveling range to a traveling range. Further, instead of the engine rotation speed, the output rotation speed of the torque converter, the degree of throttle opening, or the vehicle speed may be applied to judge whether the line pressure $P_L$ (or secondary pressure $P_{SEC}$) is lower than the predetermined value. Still further, the predetermined threshold value may be modified based on the atmospheric pressure, or the oil temperature. In a case where a hydraulic pressure sensor which detects the line pressure $P_L$ is provided on the hydraulic pressure circuit of the transmission, whether the line pressure $P_L$ (or secondary pressure $P_{SEC}$) is lower than the predetermined threshold value may be directly judged using detected signals.

In a case where it is judged that the line pressure $P_L$ (or secondary pressure $P_{SEC}$) is lower than the predetermined threshold value (YES at Step A1), the electronic control unit 41 outputs a command to the solenoid valve 26 to switch the lock-up relay valve 25 to compress the spring 25b (i.e., to be the state indicated by the circle mark in FIG. 1) (i.e., the command to output the signal pressure to the hydraulic pressure chamber 25c) at the switching command outputting portion 41b so that the amount of the operational fluid flowing to the cooler 27 is reduced (Step A2). In the foregoing state, the lubricating pressure $P_{LUB}$ outputted from the second pressure regulating valve 38 is reduced by the orifice 24 to be supplied to the cooler 27. Because the lubricating pressure $P_{LUB}$ flows through the orifice 24, the amount of the operational fluid flowing into the cooler 27 when the spring 25b of the lock-up relay valve 25 is compressed (i.e., the state indicated by the circle mark in FIG. 1) is less than the state where the spring 25b of the lock-up relay valve 25 is expanded (i.e., the state indicated by the X mark in FIG. 1). Further, in those circumstances, after the amount of the operational fluid of the secondary pressure $P_{SEC}$ outputted from the second pressure regulating valve 38 is reduced by the orifice 28, the secondary pressure $P_{SEC}$ outputted from the second pressure regulating valve 38 is introduced to the torque converter inlet side fluid passage 22, the hydraulic power transmission chamber R1, and the torque converter outlet side fluid passage 23 to be drained.

In a case where it is judged that the line pressure $P_L$ (or secondary pressure $P_{SEC}$) is not lower than the predetermined threshold value (NO at Step A1), the electronic control unit 41 judges that the hydraulic pressure has not declined and does not output the command at the switching command outputting portion 41b. In those circumstances, the electronic control unit 41 performs a control similar to the case of normal operations of the hydraulic pressure control apparatus for the torque converter (Step A3).

According to the embodiment, when it is judged that the hydraulic pressure has declined, the lock-up relay valve 25 is switched to reduce the amount of operational fluid flowing into the cooler 27. Thus, the line pressure $P_L$ is stabilized even if the output amount of the operational fluid from the oil pump 34 is small, the hydraulic pressure required for the engagement of the engaging elements of the automatic transmission is ensured, and drawbacks such as delays of gear change will be prevented.

According to the embodiment, the hydraulic pressure declination determining portion 41a judges whether the hydraulic pressure of the hydraulic pressure supply source (i.e., the line pressure $P_L$ or secondary pressure $P_{SEC}$) is lower than the threshold value based on the predetermined vehicle state including at least one of a shift position, an operational fluid temperature, an engine rotation speed, an output rotation speed of the torque converter, a vehicle speed, atmospheric pressure, a degree of throttle opening, and hydraulic pressure.

Further, according to the embodiment, the relay valve 25 is configured to establish selective connections between the inlet side fluid passage 22 of the hydraulic power transmission chamber R1 and the hydraulic pressure supply source or between the inlet side fluid passage 22 of the hydraulic power transmission chamber R1 and the second orifice 28 for switching the levels of the hydraulic pressure of the hydraulic power transmission chamber R1 to be higher or lower, and is configured to establish selective connections between the outlet side fluid passage 23 of the hydraulic power transmission chamber R1 and the cooler 27 or between the outlet side fluid passage 22 and the draining circuit DL for switching the levels of the hydraulic pressure of the hydraulic power transmission chamber R1 to be higher or lower. The relay valve 25 connects the inlet side fluid passage 22 of the hydraulic power transmission chamber R1 and the hydraulic pressure supply source and connects the outlet side fluid passage 23 of the hydraulic power transmission chamber R1 and the cooler 27 when the hydraulic pressure in the hydraulic power transmission chamber R1 is higher than the predetermined level, and the relay valve 25 connects the inlet side fluid passage 22 of the hydraulic power transmission chamber R1 and the hydraulic pressure supply source of which a flow amount of the operational fluid is regulated by the second orifice 28 and connects the outlet side fluid passage 23 of the hydraulic power transmission chamber R1 and the draining circuit DL when the hydraulic pressure in the hydraulic power transmission chamber R1 is lower than the predetermined level.

Still further, according to the embodiment, the torque converter 10 includes the lock-up clutch 15 configured to directly connect the turbine runner 14 to the power source and the hydraulic pressure control apparatus further includes the control valve 29 which regulates the hydraulic pressure from the hydraulic pressure supply source to output a lock-up pressure for engaging the lock-up clutch 15. The relay valve 25 is configured to selectively connect the control valve 29 and the lock-up clutch 15. The relay valve 25 disconnects the control valve 29 and the lock-up clutch 15 when the hydraulic pressure in the hydraulic power transmission chamber R1 is higher than the predetermined level and connects the control valve 29 and the lock-up clutch 15 when the hydraulic pressure in the hydraulic power transmission chamber R1 is lower than the predetermined level.

According to the embodiment, a required amount of the operational fluid is reduced by reducing the amount of the operational fluid to be supplied to the cooler 27 which requires a large amount of the operational fluid when shifting modes in which greater amount of the operational fluid is required at a lower rational speed of the engine (i.e., when shifting from the non-traveling mode to the traveling mode), thereby ensuring the hydraulic pressure required for shifting and preventing drawbacks such as delays of the gear change. Consequently, the output amount of the oil pump 34 at the lower rotation speed of the engine can be set to be lower thus to restrain the excessive output of the operational fluid at the higher rotational speed of the engine, and mileage, or fuel economy of the vehicle is enhanced, accordingly. Further, according to the construction of the embodiment, because the valves for the hydraulic pressure circuit of the torque converter (lock-up control circuit) are utilized, an additional valve particularly for reducing the amount of the operational fluid supplied to the cooler 27 is not required and the control for selectively reducing the amount of the operational fluid supplied to the cooler 27 is realized only by either adding a control program or changing the control program. Thus, an increase in manufacturing cost is avoided. As explained above, according to the construction of the embodiment, the hydraulic pressure control apparatus for the torque converter which stabilizes the output pressure of the oil pump during the idling state of the engine is realized without increasing manufacturing cost and without complicating the constructions. According to known constructions, the output amount of the oil pump has been designed so as to meet the required level of the hydraulic pressure in an idling state where the rotation speed of the engine is lower. With those known constructions, when the rotation speed of the engine is assumed to be higher, the output of the oil pump is assumed to be excessive relative to the required level of the hydraulic pressure, which leads to unnecessary energy consumption to decline the mileage.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A hydraulic pressure control apparatus for a torque converter in which a turbine runner is rotated by operational fluid outputted from a pump impeller rotating in a hydraulic power transmission chamber, comprising:
 a relay valve switching levels of a hydraulic pressure in the hydraulic power transmission chamber to be a higher pressure or a lower pressure and establishing selective connections between a cooler and the hydraulic power transmission chamber or between the cooler and a hydraulic pressure supply source of which a flow amount of the operational fluid is regulated by a first orifice, the relay valve connecting the cooler and the hydraulic power transmission chamber when the hydraulic pressure in the hydraulic power transmission chamber is higher than a predetermined level and connecting the cooler and the hydraulic pressure supply source when the hydraulic pressure in the hydraulic power transmission chamber is lower than the predetermined level;
 a solenoid valve operating the relay valve in accordance with an energization state;
 an electronic control unit controlling the solenoid valve;
 a hydraulic pressure declination determining portion provided in the electronic control unit for judging whether the hydraulic pressure of the hydraulic pressure supply source is lower than a threshold value based on a predetermined vehicle state; and
 a switching command outputting portion provided in the electronic control unit for outputting a command to connect the cooler and the hydraulic pressure supply source by the relay valve when the hydraulic pressure declination determining portion determines that the hydraulic pressure of the hydraulic pressure supply source is lower than the threshold value.

2. The hydraulic pressure control apparatus for the torque converter according to claim 1, wherein the hydraulic pressure declination determining portion judges whether the hydraulic pressure of the hydraulic pressure supply source is lower than the threshold value based on the predetermined vehicle state including at least one of a shift position, an operational fluid temperature, an engine rotation speed, an output rotation speed of the torque converter, a vehicle speed, atmospheric pressure, a degree of throttle opening, and hydraulic pressure.

3. The hydraulic pressure control apparatus for the torque converter according to claim 1, wherein the relay valve is configured to establish selective connections between an inlet side fluid passage of the hydraulic power transmission chamber and the hydraulic pressure supply source or between the inlet side fluid passage of the hydraulic power transmission chamber and a second orifice for switching the levels of the hydraulic pressure of the hydraulic power transmission chamber to be higher or lower, and is configured to establish selective connections between an outlet side fluid passage of the hydraulic power transmission chamber and the cooler or between the outlet side fluid passage and a draining circuit for switching the levels of the hydraulic pressure of the hydraulic power transmission chamber to be higher or lower; and wherein the relay valve connects the inlet side fluid passage of the hydraulic power transmission chamber and the hydraulic pressure supply source and connects the outlet side fluid passage of the hydraulic power transmission chamber and the cooler when the hydraulic pressure in the hydraulic power transmission chamber is higher than the predetermined level, and the relay valve connects the inlet side fluid passage of the hydraulic power transmission chamber and the hydraulic pressure supply source of which a flow amount of the operational fluid is regulated by the second orifice and connects the outlet side fluid passage of the hydraulic power transmission chamber and the draining circuit when the hydraulic pressure in the hydraulic power transmission chamber is lower than the predetermined level.

4. The hydraulic pressure control apparatus for the torque converter according to claim 1, wherein the torque converter includes a lock-up clutch configured to directly connect the turbine runner to a power source; further comprising:
 a control valve regulating the hydraulic pressure from the hydraulic pressure supply source to output a lock-up pressure for engaging the lock-up clutch; wherein
 the relay valve is configured to selectively connect the control valve and the lock-up clutch, and the relay valve disconnects the control valve and the lock-up clutch when the hydraulic pressure in the hydraulic power transmission chamber is higher than the predetermined level and connects the control valve and the lock-up clutch when the hydraulic pressure in the hydraulic power transmission chamber is lower than the predetermined level.

5. A hydraulic pressure control apparatus for a torque converter in which a turbine runner is rotated by operational fluid outputted from a pump impeller rotating in a hydraulic power transmission chamber, comprising:
 a relay valve switching levels of a hydraulic pressure in the hydraulic power transmission chamber to be a higher pressure or a lower pressure and establishing selective connections between a cooler and the hydraulic power transmission chamber or between the cooler and a hydraulic pressure supply source of which a flow amount of the operational fluid is regulated by a first orifice, the relay valve connecting the cooler and the hydraulic power transmission chamber when the hydraulic pressure in the hydraulic power transmission chamber is higher than a predetermined level and connecting the cooler and the hydraulic pressure supply source when the hydraulic pressure in the hydraulic power transmission chamber is lower than the predetermined level;

an electronic control unit controlling operations of the relay valve;

a hydraulic pressure declination determining portion provided in the electronic control unit for judging whether the hydraulic pressure of the hydraulic pressure supply source is lower than a threshold value based on a predetermined vehicle state; and a switching command outputting portion provided in the electronic control unit for outputting a command to connect the cooler and the hydraulic pressure supply source by the relay valve when the hydraulic pressure declination determining portion determines that the hydraulic pressure of the hydraulic pressure supply source is lower than the threshold value.

6. The hydraulic pressure control apparatus for the torque converter according to claim 5, wherein the hydraulic pressure declination determining portion judges whether the hydraulic pressure of the hydraulic pressure supply source is lower than the threshold value based on the predetermined vehicle state including at least one of a shift position, an operational fluid temperature, an engine rotation speed, an output rotation speed of the torque converter, a vehicle speed, atmospheric pressure, a degree of throttle opening, and hydraulic pressure.

7. The hydraulic pressure control apparatus for the torque converter according to claim 5, wherein the relay valve is configured to establish selective connections between an inlet side fluid passage of the hydraulic power transmission chamber and the hydraulic pressure supply source or between the inlet side fluid passage of the hydraulic power transmission chamber and a second orifice for switching the levels of the hydraulic pressure of the hydraulic power transmission chamber to be higher or lower, and is configured to establish selective connections between an outlet side fluid passage of the hydraulic power transmission chamber and the cooler or between the outlet side fluid passage and a draining circuit for switching the levels of the hydraulic pressure of the hydraulic power transmission chamber to be higher or lower; and wherein the relay valve connects the inlet side fluid passage of the hydraulic power transmission chamber and the hydraulic pressure supply source and connects the outlet side fluid passage of the hydraulic power transmission chamber and the cooler when the hydraulic pressure in the hydraulic power transmission chamber is higher than the predetermined level, and the relay valve connects the inlet side fluid passage of the hydraulic power transmission chamber and the hydraulic pressure supply source of which a flow amount of the operational fluid is regulated by the second orifice and connects the outlet side fluid passage of the hydraulic power transmission chamber and the draining circuit when the hydraulic pressure in the hydraulic power transmission chamber is lower than the predetermined level.

8. The hydraulic pressure control apparatus for the torque converter according to claim 5, wherein the torque converter includes a lock-up clutch configured to directly connect the turbine runner to a power source; further comprising:

a control valve regulating the hydraulic pressure from the hydraulic pressure supply source to output a lock-up pressure for engaging the lock-up clutch; wherein the relay valve is configured to selectively connect the control valve and the lock-up clutch, and the relay valve disconnects the control valve and the lock-up clutch when the hydraulic pressure in the hydraulic power transmission chamber is higher than the predetermined level and connects the control valve and the lock-up clutch when the hydraulic pressure in the hydraulic power transmission chamber is lower than the predetermined level.

* * * * *